Feb. 17, 1953     H. A. DARRIN     2,628,860
AUTOMOBILE POWER-OPERATED SLIDING DOOR CONSTRUCTION
Filed June 7, 1948     4 Sheets—Sheet 1

INVENTOR
HOWARD A. DARRIN
BY *Mason + Graham*
ATTORNEYS

Feb. 17, 1953 — H. A. DARRIN — 2,628,860
AUTOMOBILE POWER-OPERATED SLIDING DOOR CONSTRUCTION
Filed June 7, 1948 — 4 Sheets-Sheet 2

INVENTOR
HOWARD A. DARRIN
BY
ATTORNEYS

Feb. 17, 1953　　　　　H. A. DARRIN　　　　　2,628,860
AUTOMOBILE POWER-OPERATED SLIDING DOOR CONSTRUCTION
Filed June 7, 1948　　　　　　　　　　　　　　4 Sheets-Sheet 3

INVENTOR
HOWARD A. DARRIN
BY
ATTORNEYS

Feb. 17, 1953 H. A. DARRIN 2,628,860
AUTOMOBILE POWER-OPERATED SLIDING DOOR CONSTRUCTION
Filed June 7, 1948 4 Sheets-Sheet 4

INVENTOR
HOWARD A. DARRIN
BY *Murry & Graham*
ATTORNEYS

Patented Feb. 17, 1953

2,628,860

UNITED STATES PATENT OFFICE 2,628,860

AUTOMOBILE POWER-OPERATED SLIDING DOOR CONSTRUCTION

Howard A. Darrin, Los Angeles, Calif.

Application June 7, 1948, Serial No. 31,441

11 Claims. (Cl. 296—47)

This invention has to do with automobile body construction and has as one of its objects the provision of an automobile body utilizing sliding doors instead of conventional swinging doors.

Another object is the provision of an automobile body having sliding doors, in which the body is so constructed as to guide the doors into position in the body at the sides of the doorway.

A further object is the provision of an automobile sliding door construction in which the window glass frame is so mounted in the door as to cause it to disappear into the door as the latter slides into open position.

A further object is the provision in an automobile body of a power-operated door.

Still further objects and advantages will become apparent from the following description of specific structures embodying the invention; it being understood, of course, that this description is intended merely as explanatory and not as limitative since the invention is capable of being embodied in other and modified specific structures.

For purposes of the following description I shall refer to the accompanying drawings, wherein.

Figure 5:
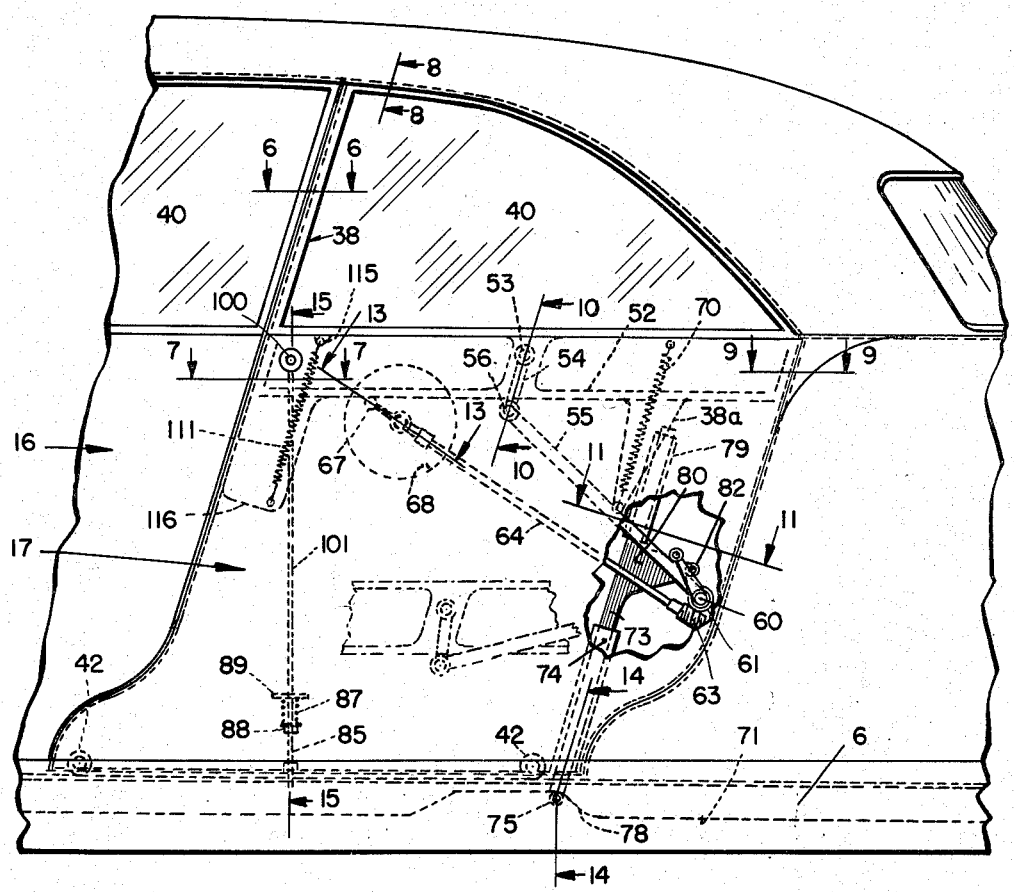
Fig. 5 is an enlarged fragmentary side elevation, with part of the outer wall broken away, and showing a window operating mechanism in partially broken lines.
Figure 11:
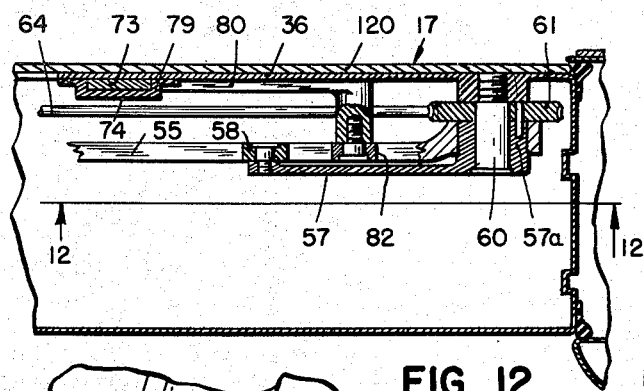
Figure 13:
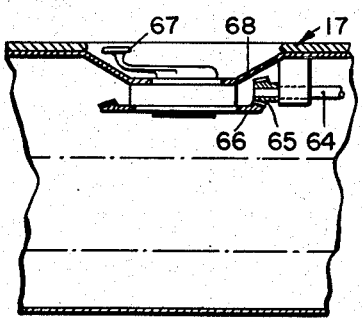
Figure 12:
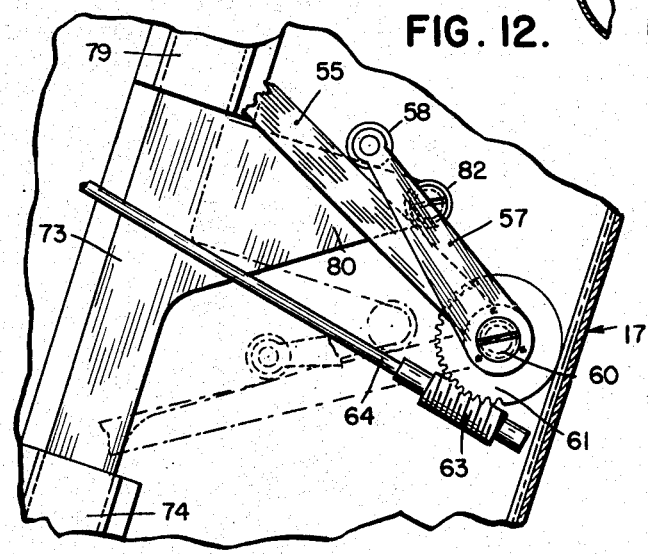
Figure 14:
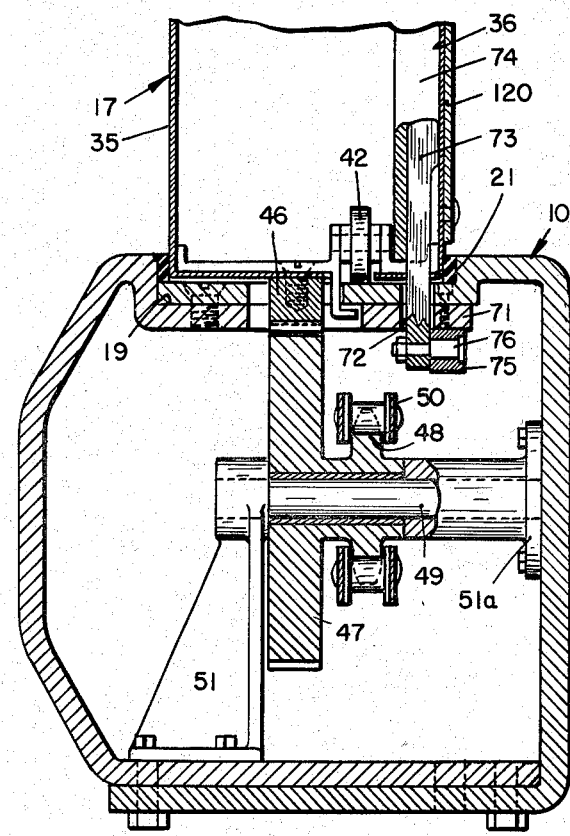
Figure 15:
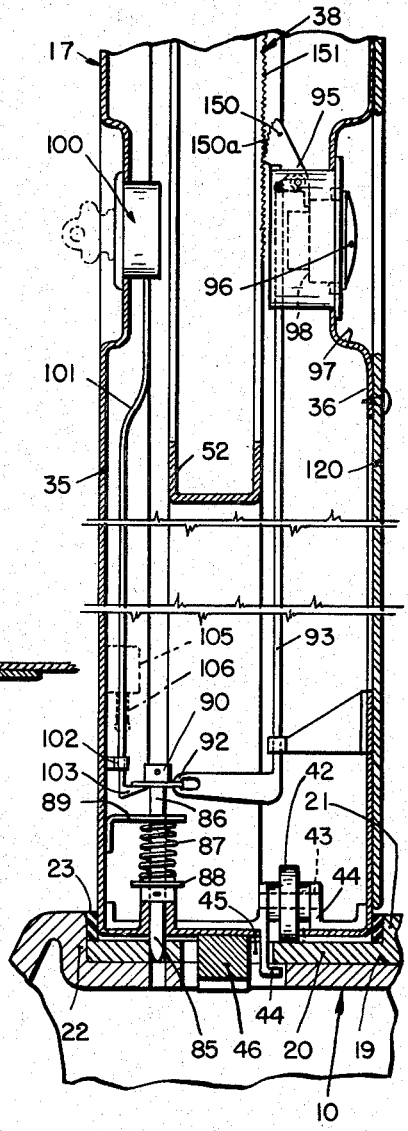
Figure 16:
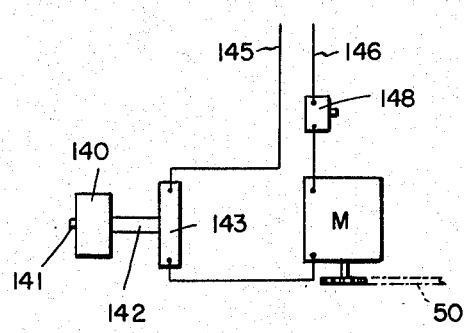

Figs. 6 to 11, inclusive, are enlarged fragmentary sections taken on lines 6—6, 7—7, 8—8, 9—9, 10—10 and 11—11, respectively, of Fig. 5;

Fig. 12 is a view taken on line 12—12 of Fig. 11;

Figs. 13, 14 and 15 are views taken, respectively, on line 13—13, 14—14 and 15—15 of Fig. 5; and Fig. 16 is a diagram illustrating the arrangement by which the door moving mechanism is operatively associated with the ignition switch in a manner to prevent the doors from being opened when the automobile is moving.

Referring to the drawings, I show at 5 an automobile body mounted upon a chassis of the type shown in my copending application, Serial No. 769,125, filed August 18, 1947, now Patent No. 2,551,528, wherein the chassis frame 10 is of boxlike cross section and extends out to a point substantially flush with the side surface of the body, the frame carrying a bumper rail 6 extending around the body, even across the fender flaps 7 and 8 in the manner shown in my copending application, Serial No. 10,093, filed February 21, 1948. The vehicle has conventional wheels 9.

The body has, at each side, an opening 15 of the width of both side doors 16, 17, in which openings the respective pairs of doors are slidably mounted, as will be hereinafter described.

Figure 8:
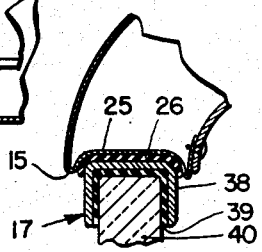
Figure 9:
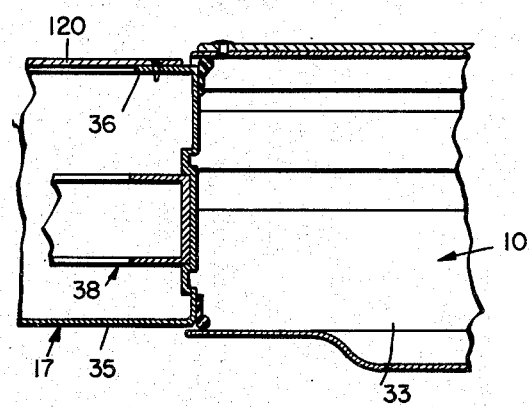

As will be best shown in Figs. 14 and 15, the chassis frame 10 has a longitudinal depression 19 in which a track 20 is mounted. The track has an inner side flange 21 and the chassis frame provides an outer side flange 22, the flanges together defining a channel to receive the bottom edge of the door, the channel being lined at 23 with rubber. Over each doorway, the top portion of the body is provided with a channel 25 in which a rubber lining 26 is mounted (Fig. 8).

Figure 1:
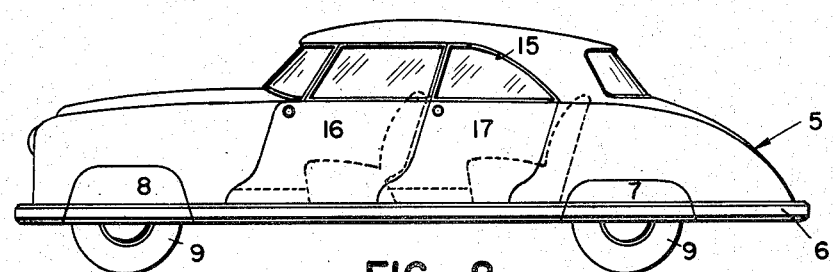
Fig. 1 is a side elevation of an automobile body having two doors on each side and embodying my invention, the doors being shown in closed position.
Figure 2:
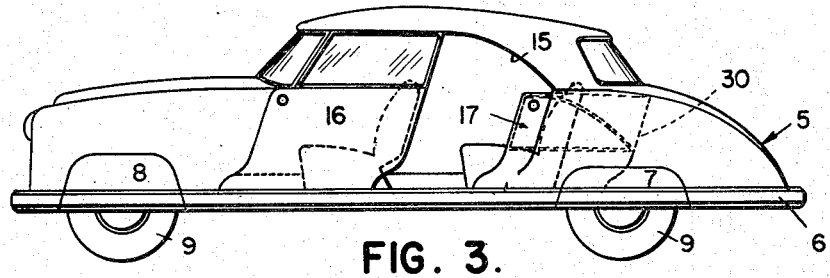
Fig. 2 is a view like Fig. 1 except that the rear doors are shown open.
Figure 3:
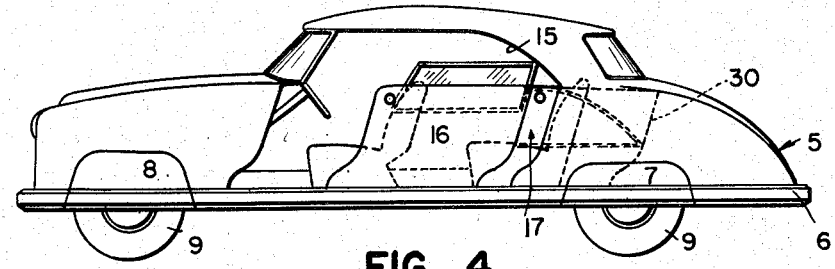
Fig. 3 is a view like Fig. 1 except that the front doors are shown open.

The broken line 30 (Figs. 2 and 3) defines the outer limits of recesses 33 formed in the respective sides of the body in behind the respective doorways to receive the doors in their opening sliding movement.

Each of the doors has an outer side wall 35 and an inner side wall 36 between which the window frame 38, lined with rubber 39, is mounted to move up and down, each frame mounting a window glass 40.

Each door is supported upon rollers 42, each of which rotates upon the spindle 43 supported by bracket 44, the rollers rolling along the track 20. Each bracket 44 may have a depending arm 44a movable along a slot 45 in track 20 and frame 10, each arm having a right angled lower end portion to underlie the plate and prevent upward movement of the door. Secured to the bottom of each door there is a rack 46 which has teeth meshing with a pinion gear 47 on whose hub teeth 48 are provided to receive a continuous chain belt 50 (Fig. 14). The belt 50 is driven from a reversible motor M (Fig. 16). Thus it will be seen that, as the belt is driven, the door is moved along its track. Gear 47 is mounted on a spindle 49 supported by brackets 51, 51a.

Figure 10:
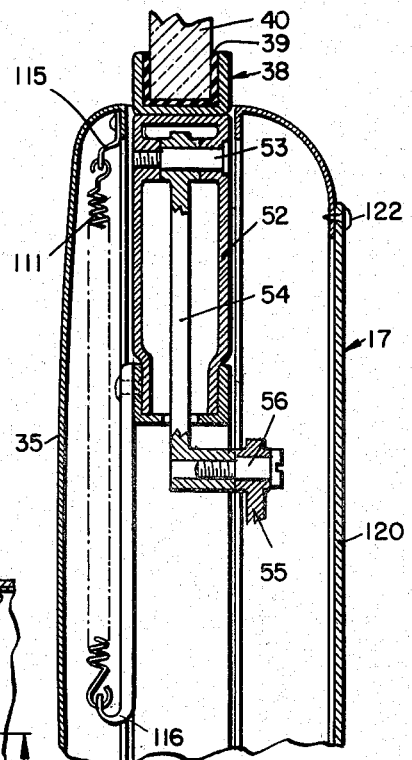

The bottom element 52 of each window frame has pivotally connected thereto, at 53, a link 54 (Figs. 5, 10, 12). A longer link 55 is pivotally connected, at 56, to the lower end of the link 54, and is rotatably mounted at its outer end on the hub 57a of a lever 57, the lever 57 being pivotally mounted on a spindle 60. Keyed to the hub 57a is a worm gear 61 which meshes with worm 63 fixed on a shaft 64 connected by gears 65, 66 (Fig. 13) to a hand crank 67 disposed within a recess 68 in the door. Lever 57 carries a roller 58 which bears against the lever 55 to provide for manual lowering of the window. With this arrangement, the window may be lowered to any desired position irrespective of the functioning of the automatic device for lowering the window simultaneously with the opening of a door. The window frame is normally urged into its uppermost position by means of a coil spring 70 anchored at one end to a depending window frame extension 38a and anchored at its other end to the door. An additional spring to be hereinafter described also normally urges the window frame upwardly.

Mounted on the under surface of frame 10 there is a second track 71 (Fig. 14) which is longitudinally slotted at 72 to pass a slide bar 73 slidably mounted in a sleeve 74 fixed to the door. A roller 75 is mounted on a spindle 76 carried by the lower end of the bar 73. The track 71 curves downwardly and rearwardly at the end of the doorway, as shown at 78 (Fig. 5) so that as the door moves rearwardly into the body recess, the rollers 75, following with the track 71, pull the bar 73 downwardly, the upper end of the bar being slidably mounted in a sleeve 79 fixed to the door.

A lateral arm 80 projects from the bar 73 and carries a roller 82 which overhangs the link 55, so that as the bar 73 moves downwardly it swings the link 55 downwardly to lower the window frame into the door. To insure against untimely lowering of a window, I provide a pawl 150, see Figure 15, the pawl being shown as a part of the bell crank 95. Hence, by depressing the button 96, or by operation of the lock 100, the toothed face 150a of the pawl is disengaged from contact with the serrations 151 in the marginal edge of the frame 38, thereby allowing downward movement of the window as may be effected by the manual crank 67 or by the automatic device as effected by the roller 75 acting on the cam track 71.

Each door is normally locked in closed position by a locking pin 85 engaging in a hole in the track member 20 (Fig. 15). This pin is carried on a rod 86 normally urged downwardly by a spring 87 bearing at its lower end against a collar 88 on the rod and bearing at its other end against a bracket 89 fixed to the door. A flanged collar 90 is fixed on the rod 86 and is engaged by the bifurcations 92 on the L-shaped slide bar 93 whose upper end is pivoted to a bell crank 95 which is actuated by push button 96 disposed in a recess 97 in the door. The push button has an annular shoulder 98 which engages an arm of the bell crank. The operation of the push button from inside the body of the automobile causes the door to be unlocked so that it may be moved into open or closed position. The door also may be unlocked from the exterior of the vehicle by means of a key actuated lock 100 which operates a rod 101 slidably mounted in a bracket 102. The lower end of the rod 101 has a lateral arm 103 which underlies the collar 90 on the rod 86 so that upward movement of the rod 101, when actuated by the lock, lifts the locking pin 85 to unlock the door.

While this locking arrangement may be used for each door, I may use for some of the doors a solenoid 105, shown in dotted lines (Fig. 15), whose core member 106 is operatively connected to the rod 101.

Each window frame is additionally normally urged into its raised or uppermost position by a spring 111 (Figs. 5 and 10). This spring is hooked at its upper end into an eye provided by a bracket 115 fixed to the door and is hooked at its lower end in an eye provided by a bracket 116 fixed to and depending from the window frame.

The inside wall of each door is cut away to provide access to the window operating parts within the door, the cutaway portion being covered by a removable panel 120 fixed to the door as by tacks or screws 122 (Fig. 10).

Figure 6:
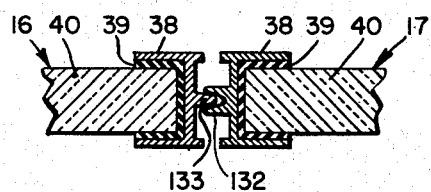
Figure 7:
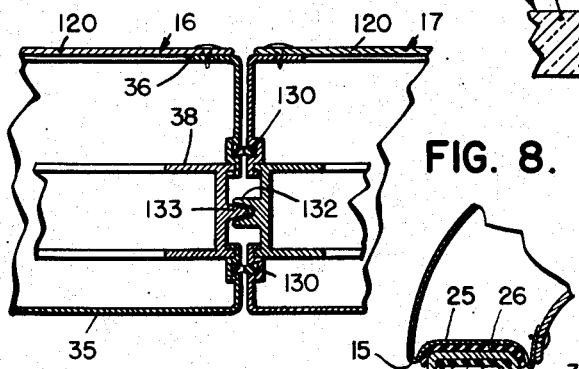

In my construction there is no necessity for a dividing post between the doors as in conventional body construction. As best shown in Figs. 6 and 7, each door at opposite sides of the window frame receiving channel has rubber gaskets 130 and each rear door window frame has a vertical channel 132 along its front side hole. Each front door window frame has a vertical rib 133 which fits in the channel when the doors are closed.

In Fig. 16 I illustrate a means for preventing the doors from being opened while the vehicle is in operation. Here the reference numeral 140 indicates the conventional ignition switch of an automobile, having a rotatable element 141 adapted to be operated by a key (not shown). I provide an extension 142 of this rotatable element, which extension operates a second switch 143 in a direction opposite to that in which the ignition switch is actuated by the element 141; that is, when the ignition switch is closed the switch 143 is opened, and vice versa. M indicates the electrical motor which drives the link belt 50 operating the doors, and the numerals 145, 146 denote the circuit wires for energizing the motor. Wire 145 leads through control switch 143 to the motor M, while wire 146 leads through a control switch 148 to the motor M which is push-button actuated to close the circuit to the motor when it is desired to operate the doors. Thus when the ignition is turned on, the circuit to the door operating motor is opened and even though one might operate the switch 148 with the intention of starting the motor, the motor would not operate until the ignition switch is turned off, which automatically closes leg 145 of the circuit to the motor.

In the embodiment described, the doors at each side are separate from each other and may be moved forwardly or rearwardly. As the respective doors move along their tracks into the door receiving recesses in the sides of the doorway, the roller 75 cooperates with the curved track portion 78 automatically to move the window frame downwardly into the door against the tension of springs 70, 111; and as a door moves out of a body recess, the springs pull the window frames upwardly. The front portions of the tracks 71 also have curved portions corresponding to curvature 78.

Figure 4:
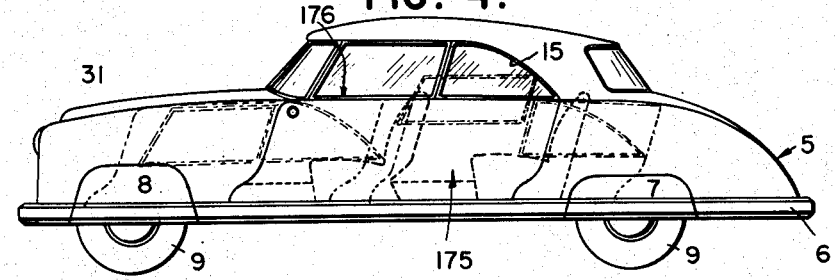
Fig. 4 is a side elevation of a modification of the invention utilizing only one door at each side.

In the embodiment of Fig. 4, at each side of the body there is a single door 175 instead of the two doors 16, 17. Each door 175 has two relatively movable window frames 176 mounted and operated as before described. To open each door to allow access to the rear seat, the door 175 is moved forwardly, the front portion of the door and its carried window moving into body recess 31, as shown by the broken lines. To allow access to the front seat of the vehicle, the door is moved rearwardly until its rear portion and its carried window move into the body recess, as shown by the broken lines.

I claim:

1. In an automobile body having a doorway and a door receiving recess opening into said doorway, track means along the bottom of the doorway, a door, roller means mounting the door for movement along the track means, the door having a window receiving recess opening through its top edge, a window carried by the door for movement in a vertical plane into and out of said latter recess, a second track carried by the body below the doorway, follower means carried by the door for engagement with said second track, said follower means being operable in response to movement of the door into the door receiving recess to move the window downwardly into the window receiving recess and means for moving the window upwardly in the recess.

2. In an automobile body having a doorway and a door receiving recess opening into said doorway, track means along the bottom of the doorway, a door, roller means mounting the door for movement along the track means, the door having a window receiving recess opening through its top edge, a window carried by the door for movement in a vertical plane into and out of said latter recess, a second track carried by the body below the doorway, follower means carried by the door for engagement with said second track, said follower means being operable in timed relation to movement of the door into the door receiving recess to move the window downwardly into the window receiving recess and means for moving the window upwardly in the recess.

3. In an automobile body having a doorway and a door receiving recess opening into said doorway, track means along the bottom of the doorway, a door, roller means mounting the door for movement along the track means, the door having a window receiving recess opening through its top edge, a window carried by the door for movement in a vertical plane into and out of said latter recess, a second track carried by the body below the doorway, follower means carried by the door for engagement with said second track, said follower means being operable in response to movement of the door into the door receiving recess to move the window downwardly into the window receiving recess and spring means for moving the window upwardly in the recess.

4. In an automobile body having a doorway and a door receiving recess opening into said doorway, track means along the bottom of the doorway, a door, roller means mounting the door for movement along the track means, the door having a window receiving recess opening through its top edge, a window carried by the door for movement in a vertical plane into and out of said latter recess, a second track carried by the body below the doorway, follower means carried by the door for engagement with said second track, said follower means being operable in response to movement of the door into the door receiving recess to move the window downwardly into the window receiving recess, means independent of the last named means for moving the window downwardly into said window receiving recess, and means for moving the window upwardly in the recess.

5. In an automobile body having a doorway and a door receiving recess opening into said doorway, track means along the bottom of the doorway, a door, roller means mounting the door for movement along the track means, the door having a window receiving recess opening through its top edge, a window carried by the door for movement in a vertical plane into and out of said latter recess, means for moving the window downwardly in the window receiving recess, comprising a stationary downwardly curved downwardly facing track carried by the body below the doorway, a slide bar slidably mounted in the door below the window, a roller carried by the lower portion of the slide bar in engagement with the latter track, means operatively connecting the window to the slide bar, and means for moving the window upwardly in the window receiving recess.

6. In an automobile body having a doorway and a door receiving recess opening into said doorway, track means along the bottom of the doorway, a door, roller means mounting the door for movement along the track means, the door having a window receiving recess opening through its top edge, a window carried by the door for movement in a vertical plane into and out of said latter recess, means for moving the window downwardly in the window receiving recess, comprising a stationary downwardly curved downwardly facing track carried by the body below the doorway, a slide bar slidably mounted in the door below the window, a roller carried by the lower portion of the slide bar in engagement with the latter track, means operatively connecting the window to the slide bar, including a link pivotally connected at one end to the window, means, carried by the door, rotatably supporting the opposite end of the link, and a roller carried by the slide bar for engagement with the link to swing it downwardly as the silde bar moves downwardly, and means for moving the window upwardly in the window receiving recess.

7. In an automobile body having a doorway and a door receiving recess opening into said doorway, track means along the bottom of the doorway, a door, roller means mounting the door for movement along the track means, the door having a window receiving recess opening through its top edge, a window carried by the door for movement in a vertical plane into and out of said latter recess, means for moving the window downwardly in the window receiving recess, comprising a stationary downwardly curved downwardly facing track carried by the body below the doorway, a slide bar slidably mounted in the door below the window, a roller carried by the lower portion of the slide bar in engagement with the latter track, means operatively connecting the window to the slide bar, including a link pivotally connected at one end to the window, means, carried by the door, rotatably supporting the opposite end of the link and a roller carried by the slide bar for engagement with the link to swing it downwardly as the slide bar moves downwardly, means for moving the window upwardly in the window receiving recess, and manually operable gear means carried by the door to swing the link downwardly, said latter means being independent of the slide bar.

8. In an automobile body having a doorway and a door receiving recess opening into said doorway, track means along the bottom of the doorway, a door mounted for movement along the track means, a window carried by the door for vertical movement relative thereto and means for moving the window in response to movement of the door, comprising a downwardly facing track mounted on the body under the door, a roller mounted on the door and movable along said track and means operatively connecting the roller to the window; said latter track having linearly arranged relatively high and low lengths engageable by the roller, said lengths intersecting each other in a curved portion, whereby movement of the roller along said latter track causes movement of said window.

9. In an automobile body having a doorway and a door receiving recess opening into said doorway, track means along the bottom of the doorway, a door, roller means mounting the door for movement along the track means, the door having a window receiving recess opening through its top edge, power means for moving the door, a window carried by the door for movement in a vertical plane into and out of said latter recess, a second track carried by the body below the doorway, follower means carried by the door for engagement with said second track, said follower means being operable in response to movement of the door into the door receiving recess to move the window downwardly into the window receiving recess and means for moving the window upwardly in the recess.

10. In an automobile body having a doorway and a door receiving recess opening into said doorway, track means along the bottom of the doorway, a door, roller means mounting the door for movement along the track means, the door having a window receiving recess opening through its top edge, a rack carried by the bottom of the door, a pinion engaging the rack, a motor and a belt operatively connecting the motor and pinion, a window carried by the door for movement in a vertical plane into and out of said latter recess, a second track carried by the body below the doorway, follower means carried by the door for engagement with said second track, said follower means being operable in response to movement of the door into the door receiving recess to move the window downwardly into the window receiving recess and means for moving the window upwardly in the recess.

11. In a closed vehicle body having a vertically elongated opening for entrance and exit, the combination of a vertically foreshortened recess formed within the confines of the body and disposed therein in communication with the lower part of the opening, a door structure normally adapted to close the opening and including an upper section having a portion thereof normally extending above the level of the recess and a lower section disposed to one side of said recess and beneath the upper section, a preselector device between the upper and lower sections and adapted to maintain the upper section within the lower section or automatically raise the upper section to a selected position within the body opening, upon return of the lower section to normal position, actuating means between the sections for lowering the upper section into the lower section, control means for sliding the collapsed door into the recess and return, and means connecting the control means to the actuating means.

HOWARD A. DARRIN.

REFERENCES CITED

The following references are of record in the file of this patent:

UNITED STATES PATENTS

| Number | Name | Date |
|---|---|---|
| 1,235,639 | Benjamin | Aug. 7, 1917 |
| 1,621,802 | Morrison | Mar. 22, 1927 |
| 1,712,588 | Small | May 14, 1929 |
| 1,928,523 | Bally | Sept. 26, 1933 |
| 2,020,817 | Wexelberg | Nov. 12, 1935 |
| 2,110,125 | Galloway | Mar. 8, 1938 |
| 2,146,638 | Magid | Feb. 7, 1939 |
| 2,194,792 | Baade | Mar. 26, 1940 |
| 2,214,722 | De Seversky | Sept. 10, 1940 |
| 2,459,502 | Craig | Jan. 18, 1949 |
| 2,548,950 | Coles | Apr. 17, 1951 |